United States Patent [19]
Graus et al.

[11] Patent Number: 5,885,455
[45] Date of Patent: Mar. 23, 1999

[54] FILTRATION UNIT WITH PLEATED FILTER ELEMENT

[75] Inventors: Andreas Graus, Nörten-Hardenberg; Michael Schützler, Rosdorf, both of Germany

[73] Assignee: Satorius AG, Germany

[21] Appl. No.: 998,260

[22] Filed: Dec. 24, 1997

[30] Foreign Application Priority Data

Feb. 6, 1997 [DE] Germany ............... 197 04 465.4

[51] Int. Cl.[6] .................................................. B01D 27/08
[52] U.S. Cl. ................. 210/445; 210/493.1; 210/493.3; 210/493.5; 55/497; 55/521
[58] Field of Search .................. 210/445, 493.1, 210/493.3, 493.5; 55/497, 521

[56] References Cited

U.S. PATENT DOCUMENTS

| | | | |
|---|---|---|---|
| 2,135,863 | 11/1938 | Walker . | |
| 4,133,661 | 1/1979 | Strnad | 55/497 |
| 4,177,050 | 12/1979 | Culbert et al. | 55/499 |
| 4,386,948 | 6/1983 | Choksi et al. | 55/499 |
| 4,455,823 | 6/1984 | Bly et al. | 55/215 |
| 4,617,122 | 10/1986 | Kruse et al. | 210/493.3 |
| 4,808,203 | 2/1989 | Sabourin | 55/492 |
| 5,505,852 | 4/1996 | Van Rosen | 210/493.3 |
| 5,531,892 | 7/1996 | Duffy | 210/493.1 |

*Primary Examiner*—David A. Reifsnyder
*Attorney, Agent, or Firm*—Chernoff, Vilhauer, aMcClung & Stenzel LLP

[57] ABSTRACT

A fluid filtration unit having pleated filter media with at least one ply, and two housing parts with inlet and outlet fluid passageways and inwardly projecting ribs that accommodate the pleated filter media.

9 Claims, 2 Drawing Sheets

FILTRATION UNIT WITH PLEATED FILTER ELEMENT

BACKGROUND OF THE INVENTION

Compact filtration units are well known. One such unit is a blood filter, comprising a multi-piece, rectangular housing with coaxial fluid connections, the connections being separated from each other by a multi-layered, pleated filter element so as to permit a fluid to be filtered to pass from inlet to outlet only by flowing through the filter element. The filter element at each of the two protruding ends is clamped between two specially designed wall components of the top and bottom housing components and welded thereto. The filter element is also secured at the two outer sides by a sealant.

German Patent No. 24 44 224 C3 also discloses a filtration unit with a pleated filter element, comprising five aligned plate-shaped components. The filter element is supported on the filtrate side by means of a porous carrier that has ribs which extend into the pleat folds. The pleated filter element is further supported by sections of the central plate-shaped components, to which the filter element is cemented at its sides so as to render it fluid-tight.

The drawbacks of such prior art devices are their large number of components and the existence of areas in which the individual components of the filtration unit are so tightly bound to each other that fluid flow is restricted. In addition, such devices are difficult to fabricate because of their complex construction, and the multiplicity of fluid-tight connections present more potential leakage points, often leading to premature breakdown of the filter units during operation. A still further disadvantage is that such filter units possess a relatively large dead space between the filter element and the housing components. This is undesirable in the cases of toxic and highly refined, costly materials. Finally, the pleated filter elements, which have either no support or support on one side only, can be distorted by fluctuations in fluid pressure or by back flushing.

There is therefore a need in the art for a fluid filtration unit having a single filter element which will withstand pressure fluctuations and back flushing, that is made of a small number of components and that has a minimum amount of dead space. These needs are met by the present invention, which is summarized and described in detail below.

SUMMARY OF THE INVENTION

The invention comprises a fluid filter unit having a pleated filter element with at least one ply, which is confined within a rectangular housing made of only two housing parts, with inlet and outlet fluid connections, wherein the open folds and the inner apexes of one side of the pleated filter element are oriented toward the inlet and conversely, the open folds and the inner apexes of the other side of the filter element are oriented toward the outlet. The two housing parts, on their sides facing the filter element, have peripheral, circumscribing clamping surfaces, between which are sealingly clamped the sides and the ends of the outwardly extending fold edges of the pleated filter element. The peripheral clamping surface itself extends outwardly around the sides of the housing parts to a width of some 0.1 to 2 cm, preferably between 0.3 to 1 cm. The housing parts are united into a fluid-tight encapsulation of the pleated filter elements around the peripheral clamping surface by conventional means.

The filtration unit may be constructed very compactly. It has utility for filtration in areas such as biotechnology, gene technology, pharmaceuticals, chemistry, environmental sciences and in the food and beverage industries. Because of the filter unit's compact design, its favorable ratio of filter surface area to housing volume and its small amount of dead space, it is useful in laboratories, for scale-up applications and, when equipped with membrane adsorbers, may be used for the recovery of valuable materials.

DETAILED DESCRIPTION OF PREFERRED EMBODIMENTS

Figure 1:
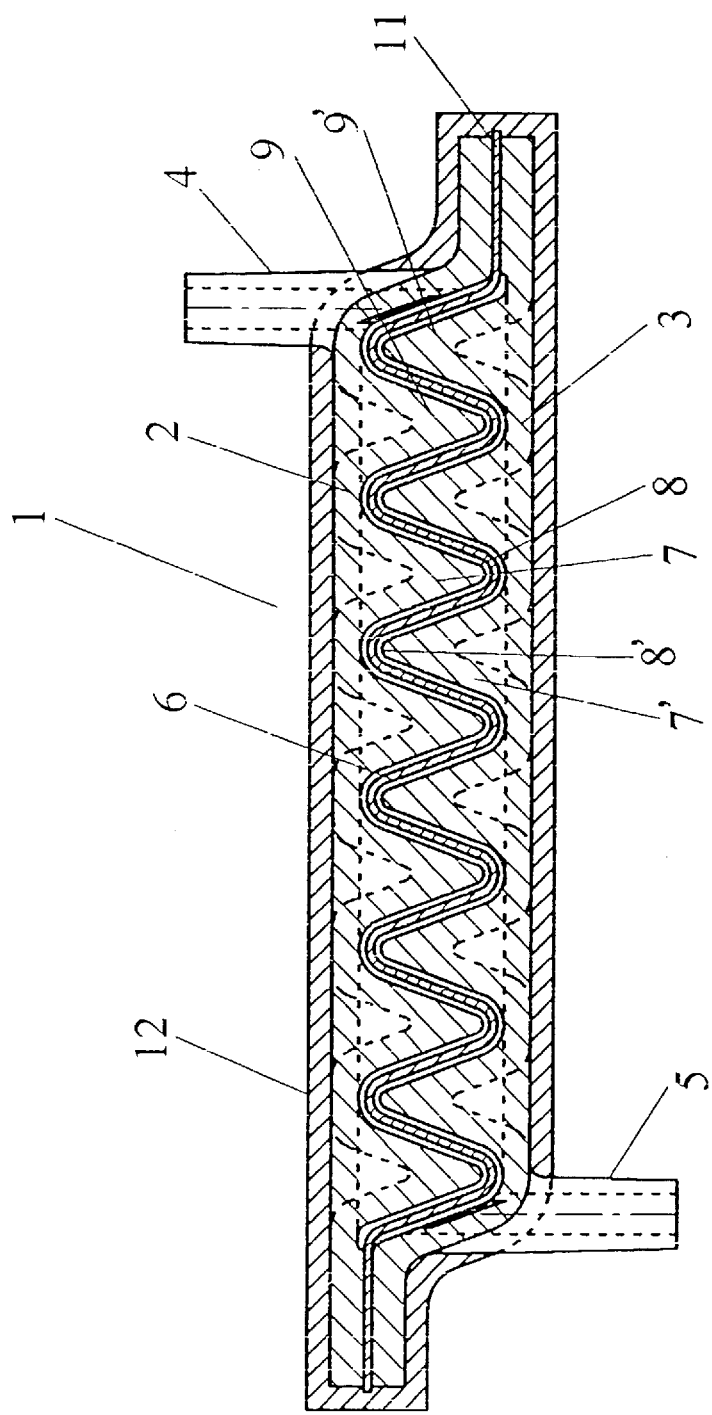
FIG. 1 is a cross sectional view of an exemplary filtration unit of the present invention.
Figure 2:
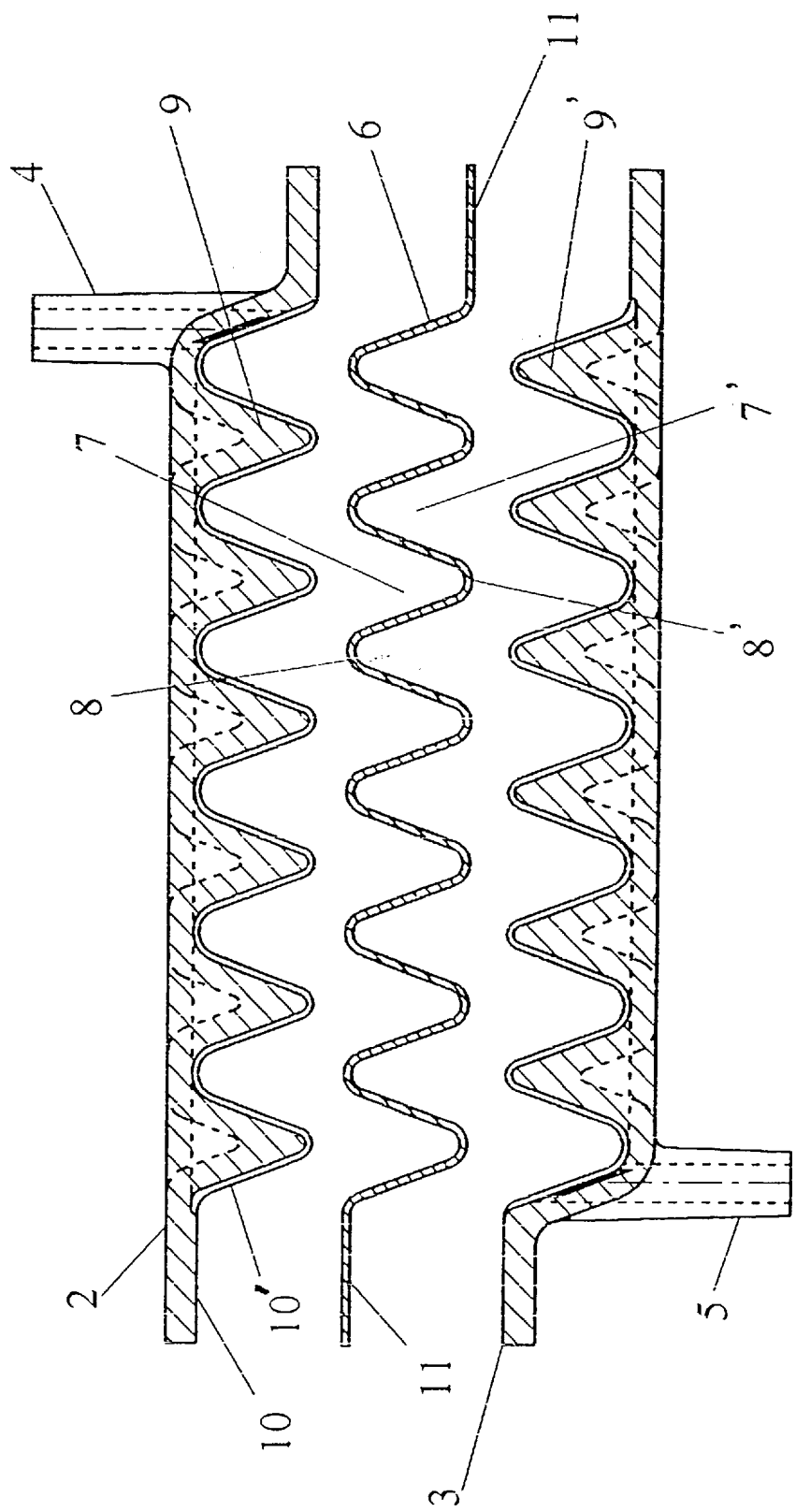
FIG. 2 is an exploded view of the two housing parts and of the pleated filtration element of the filtration unit of the present invention.

As shown in FIGS. 1 and 2, the filtration unit 1 comprises two housing parts 2 and 3, each with a fluid passageway 4 and 5 and a common pleated filter element 6. If the direction of flow in the filtration unit is from top to bottom, then passageway 4 represents the fluid inlet while passageway 5 represents the fluid outlet. If the direction of flow in the filtration unit is from bottom to top, then passageway 5 represents fluid inlet while passageway 4 represents the fluid outlet.

The pleats in pleated filter element 6 comprise open folds 7 and inner apexes 8 on one side which are oriented toward the fluid inlet, and open folds 7' and inner apexes 8' on the other side, which are oriented toward the fluid outlet. Housing parts 2 and 3 are provided with inwardly projecting ribs 9 and 9' which, in their size and form, loosely fit open pleat folds 7 and 7' so as to give them a pleat-like profile, which in turn minimizes dead space between the housing parts and the filter element.

Housing parts 2 and 3 also are provided with peripheral clamping surfaces 10 and 10' comprising stepped up or raised portions along the edges, between which the overlapping sides (details not shown) and ends 11 of the pleated filter element 6 are clamped. Because of the raised portion all along the edges of the housing parts 2 and 3, there are formed two accordion-style plenums on opposite sides of the filter element, such plenums permitting fluid passage on both sides, yet minimizing dead space in the filter. Peripheral clamping surfaces 10 and 10' may be rendered fluid-tight by application of a resin thereto or by thermal bonding, particularly suitable when housing portions 2 and 3 are made of a polymeric material.

In one embodiment of the invention, the pleated filter element 6 is slightly larger than opposing housing parts 2 and 3, so that the filter element extends beyond the housing edges up to 1 mm, preferably between 0.2 and 0.5 mm. Such a protrusion of the pleated filter element 6 is rendered fluid-tight by, for example, the spray application of a resin to peripheral surfaces 10 and 10'. Ribs 9 and 9' function both as reinforcing support on both sides of the pleat folds, and to prevent the formation of a non-fluid flow dead space between the pleat folds.

While the shape of the ribs is optional, they are preferably so profiled that they substantially conform to the shape of the pleat folds. To obtain optimal filter surface area while minimizing filter element materials, the ribs are preferably triangular- or trapezoidal-shaped in cross section with rounded-off apexes and a slope of the sides of approximately 20° to 70°, most preferably 30° to 40°.

In an especially preferred embodiment of the invention, the peripheral clamping surfaces 10 and 10' are stepped up or raised between 0.01 and 1 mm, preferably between 0.05 and 0.2 mm. This stepped up edge of the clamping surfaces forms a gap or plenum between the filter element and the ribs, the height of the gap corresponding to the height of the step up of the edge clamping surfaces. So as to assure an extremely small dead space volume, pleated filter element 6 is covered on the inlet or outlet side, or both, with a generally flat, pleated and compressible material, which material simultaneously functions as a prefilter and assists in filtrate removal. An exemplary such compressible material is microfiber matting. For improved flow of the fluid to be filtered and for the filtrate to be collected, the ribs on both housing parts can be made discontinuous (not shown).

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A filtration device comprising:
   (a) pleated filter media having at least one ply and a multiplicity of pleats, said filter media being disposed and secured between
   (b) opposing housing components each having a fluid passageway and corresponding projections that accommodate said pleats in said pleated filter media, said housing components having raised and undulated mating surfaces along their peripheries arranged such that when said raised and undulated mating surfaces are matingly engaged, undulated plenums are formed on opposite sides of said pleated filter media.

2. The device of claim 1 wherein said corresponding projections are elongate ribs.

3. The device of claim 2 wherein at least a portion of said corresponding projections are discontinuous.

4. The device of claim 1 wherein said pleats and said corresponding projections have a cross-sectional shape selected from triangular and trapezoidal.

5. The device of claim 1 wherein one fluid passageway acts as a fluid inlet and the other acts as a fluid outlet.

6. The device of claim 1 wherein said filter media is at least two-ply wherein at least one ply comprises microfiber matting.

7. The device of claim 6 wherein said at least one ply of microfiber matting is oriented in a plane located in a position selected from the inlet side of said pleated filter media, the outlet side of said pleated filter media and both sides of said pleated filter media.

8. The device of claim 1 wherein said opposing housing components are of polymeric material and are secured to each other by a method selected from the application of a resinous adhesive and by thermal bonding.

9. The device of claim 7 wherein said filter media extends beyond said corresponding projections.

* * * * *